(12) United States Patent
Chepizhenko et al.

(10) Patent No.: US 12,088,678 B2
(45) Date of Patent: Sep. 10, 2024

(54) TRACKING USAGE OF AUGMENTED REALITY CONTENT ACROSS MULTIPLE USERS

(71) Applicant: Snap Inc., Santa Monica, CA (US)

(72) Inventors: Oleksandr Chepizhenko, Marina Del Rey, CA (US); Maxwell Gale, New York, NY (US); Jean Luo, Seattle, WA (US); Alek Matthiessen, Marina Del Rey, CA (US); Vincent Sung, Los Angeles, CA (US); Yichuan Wang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 391 days.

(21) Appl. No.: 17/362,815

(22) Filed: Jun. 29, 2021

(65) Prior Publication Data

US 2021/0409502 A1 Dec. 30, 2021

Related U.S. Application Data

(60) Provisional application No. 63/046,607, filed on Jun. 30, 2020.

(51) Int. Cl.
*G06F 15/173* (2006.01)
*H04L 67/10* (2022.01)
*H04L 67/306* (2022.01)
*H04L 67/50* (2022.01)

(52) U.S. Cl.
CPC ............ *H04L 67/535* (2022.05); *H04L 67/10* (2013.01); *H04L 67/306* (2013.01)

(58) Field of Classification Search
CPC ....... H04L 67/535; H04L 67/10; H04L 67/01; H04L 67/306

USPC ................................ 709/224, 223, 203, 206
See application file for complete search history.

(56) References Cited

U.S. PATENT DOCUMENTS

| | | | | |
|---|---|---|---|---|
| 9,471,676 | B1* | 10/2016 | Berent | G06F 16/745 |
| 9,582,919 | B2* | 2/2017 | Gould | G06T 15/04 |
| 2010/0287485 | A1* | 11/2010 | Bertolami | G06F 3/011 |
| | | | | 715/764 |
| 2011/0107241 | A1* | 5/2011 | Moore | G06F 16/958 |
| | | | | 709/224 |
| 2014/0172837 | A1* | 6/2014 | Sommer | H04L 65/403 |
| | | | | 709/204 |

(Continued)

FOREIGN PATENT DOCUMENTS

| | | |
|---|---|---|
| CN | 115843369 A | 3/2023 |
| WO | 2022006289 | 1/2022 |

OTHER PUBLICATIONS

"International Application Serial No. PCT/US2021/039919, International Search Report mailed Oct. 18, 2021", 4 pgs.

(Continued)

*Primary Examiner* — Kaylee J Huang
(74) *Attorney, Agent, or Firm* — Schwegman Lundberg & Woessner, P.A.

(57) ABSTRACT

In one or more implementations, usage of augmented reality content items may be tracked based on characteristics of respective target audiences of the augmented reality content items. User tracking components may be included with respective instances of the augmented reality content items that analyze characteristics of users of the client application access the augmented reality content items in relation to the characteristics of the target audiences.

20 Claims, 10 Drawing Sheets

(56) References Cited

U.S. PATENT DOCUMENTS

| | | | |
|---|---|---|---|
| 2014/0280105 A1* | 9/2014 | Resende | G06F 16/2477 |
| | | | 707/725 |
| 2015/0206349 A1* | 7/2015 | Rosenthal | G06T 19/006 |
| | | | 345/633 |
| 2018/0025372 A1 | 1/2018 | Ahmed et al. | |
| 2018/0041520 A1* | 2/2018 | Liu | H04L 9/0618 |
| 2018/0164986 A1* | 6/2018 | Al Majid | G06F 9/543 |

OTHER PUBLICATIONS

"International Application Serial No. PCT/US2021/039919, Written Opinion mailed Oct. 18, 2021", 6 pgs.

"European Application Serial No. 21746269.6, Response filed Aug. 2, 2023 to Communication pursuant to Rules 161(1) and 162 EPC mailed Feb. 7, 2023", 24 pgs.

"International Application Serial No. PCT/US2021/039919, International Preliminary Report on Patentability mailed Jan. 12, 2023", 8 pgs.

* cited by examiner

TRACKING USAGE OF AUGMENTED REALITY CONTENT ACROSS MULTIPLE USERS

CROSS-REFERENCE TO RELATED APPLICATION

This patent application claims the benefit of U.S. Provisional Patent Application No. 63/046,607, filed Jun. 30, 2020, entitled "TRACKING USAGE OF AUGMENTED REALITY CONTENT ACROSS MULTIPLE USERS", which is incorporated by reference herein in its entirety.

BACKGROUND

Applications executed by client devices may be used to generate content. For example, client applications may be used to generate messaging content, image content, video content, audio content, media overlays, documents, creative works, combinations thereof, and the like. In various situations, user content may be modified by augmented reality content.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
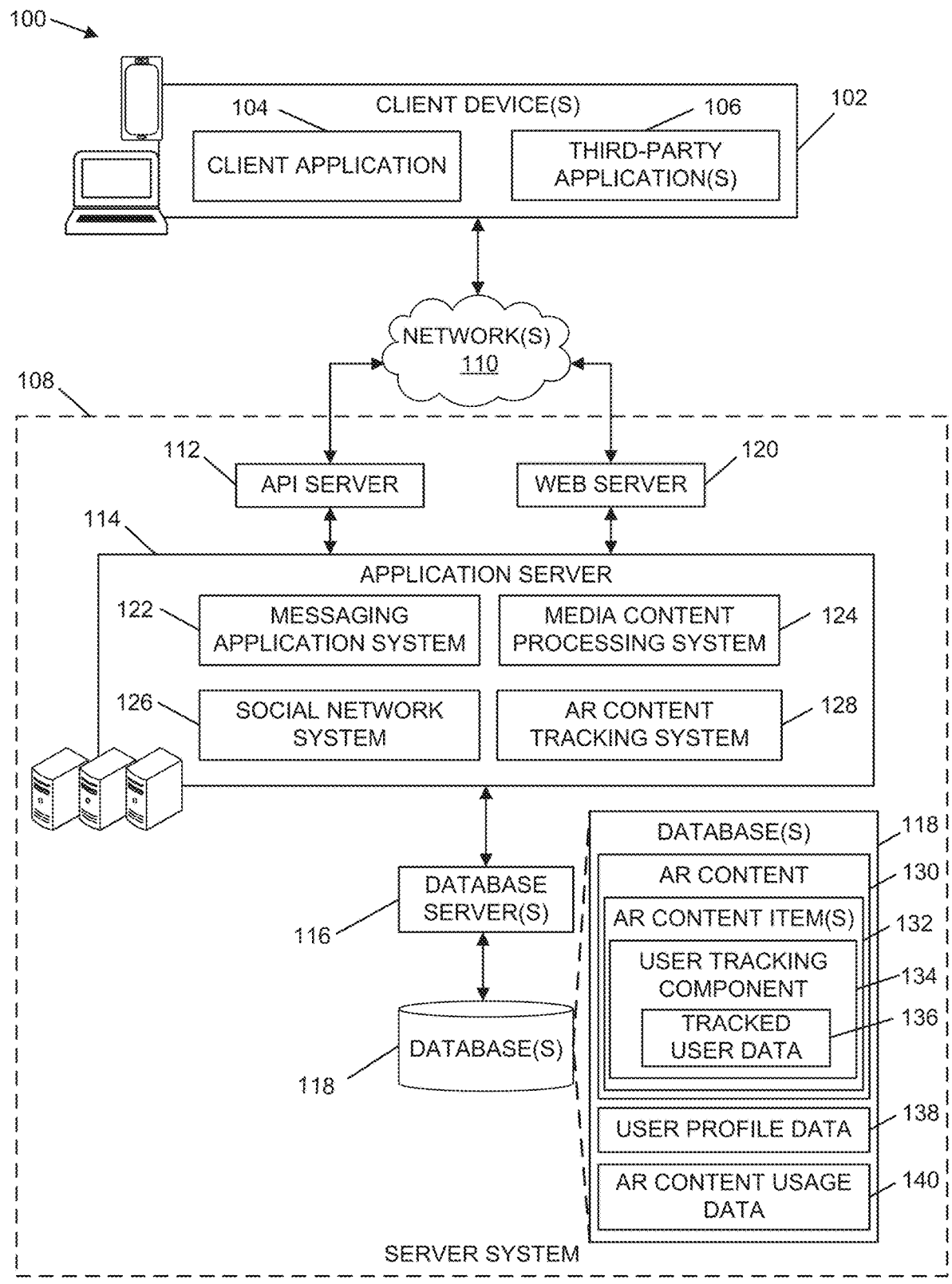
FIG. 1 is a diagrammatic representation of an architecture for exchanging data (e.g., messages and associated content) over a network, according to one or more example implementations.

Individuals and organizations may create augmented reality content that may be consumed by users of a client application that may execute the augmented reality content. For example, augmented reality content may be created that modifies an appearance of one or more objects included in user content, where the user content may include at least one of image content, video content, or audio content captured via one or more input devices of a client device. To illustrate, augmented reality content may modify an appearance of one or more individuals included in user content. In one or more examples, the augmented reality content may modify user content by adding at least one of image content or video content to user content that modifies an appearance of an object included in the user content. In various examples, the augmented reality content may overlay at least a portion of an object included in the user content. Additionally, the augmented reality content may modify pixel data of image content or video content to change an appearance of at least one object included in the user content.

In existing systems and methods, the amount of information that augmented reality content creators may obtain about the use of their augmented reality content is limited. In one or more examples, augmented reality content creators may obtain information indicating an amount of time that users of a client application have viewed the augmented reality content or a number of times that the augmented reality content has been shared with additional users of the client application. In addition, augmented reality content creators are, at best, able to obtain limited information about the characteristics of users of the client application that are consuming the augmented reality content generated by these creators. Existing systems and methods generate augmented reality content that lacks the technical functionality to track the usage of augmented reality content in ways that provide more robust information to augmented reality content creators about the use of the augmented reality content they have created, in particular, existing systems are limited in the tracking of usage of augmented reality content as it is shared by users of a client application. Accordingly, the technical infrastructure used by existing systems and methods limits the information that creators of augmented reality content may obtain about users of the client application that are using augmented reality content items produced by these creators.

The systems, methods, techniques, instruction sequences, and computing machine program products described herein are directed to collecting and analyzing augmented reality content usage data. The implementations described herein may be used to obtain additional information related to the use of augmented reality content that is not available with existing systems and methods. For example, implementations described herein may collect profile information of users of a client application that interact with augmented reality content. In various examples, implementations described herein obtain profile information about users of the client application that have obtained augmented reality content items from other users of the client application, such as via messaging or sharing. Implementations described herein may also analyze the information collected about the client application users. In this way, the systems and methods described herein may provide detailed information to augmented reality content creators about the users that consume the augmented reality content generated by these creators. In one or more scenarios, augmented reality content creators may customize the information obtained about users of the client application that interact with augmented reality content from these creators.

In various examples, the systems and methods described herein may be directed to augmented reality content items for which usage information may be collected as the augmented reality content items are propagated across users of the client application. For example, a user of the client application may interact with an augmented reality content item and profile information about the user may be collected and analyzed. In addition, the user of the client application may share the augmented reality content item with one or more additional users of the client application. At least a portion of the one or more additional users of the client application may also interact with the augmented reality content item. In these scenarios, the augmented reality content item may include components that enable profile information to be collected and analyzed of the subsequent users of the client application that interacted with the augmented reality content item in conjunction with the profile information of an initial user of the client application that interacted with the augmented reality content item.

The creators of augmented reality content may select features of client applications users to track in relation to the augmented reality content items produced by these creators. The augmented reality content items may subsequently include components that enable the tracking of these features with respect to users of the client application that interact with the augmented reality content items. In various examples, different augmented reality content creators may specify different features of client application users to be tracked. In these situations, the user profile information extracted with respect to the different augmented reality content items may also be different. Additionally, the respective augmented reality content items may have components indicating the user profile information to be extracted.

Accordingly, the systems, methods, techniques, instruction sequences, and computing machine program products described herein provide various implementations to collect more information about the use of augmented reality content than existing systems and methods by providing an underlying technical architecture that enables the tracking of interactions by client application users with augmented reality content items as the augmented reality content items are propagated from user to user. In this way, the systems and methods described herein may provide at least one of additional insights or more accurate insights in relation to existing systems and methods for augmented reality content creators with regard to the client application users that interact with the augmented reality content items generated by these creators. As a result, the augmented reality content creators may identify client application users that are more likely to interact with their augmented reality content than existing systems and methods.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114, The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 108 may also include a web server 120. The web server 120 is coupled to the application servers 114, and provides web-based interfaces to the application servers 114. To this end, the web server 120 processes incoming network requests over the Hypertext Transfer Protocol (HTPP) and several other related protocols.

The application server 114 hosts a number of applications and subsystems, including a messaging application system 122, a media content processing system 124, a social network system 126, and an AR content tracking system 128. The messaging application system 122 implements a number of message processing technologies and functions, particularly related to the aggregation and other processing of content (e.g., textual and multimedia content) included in messages received from multiple instances of the client application 104. For example, the messaging application system 122 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the client application 104. Other processor- and memory-intensive processing of data may also be performed server-side by the messaging application system 122, in view of the hardware requirements for such processing.

The media content processing system 124 is dedicated to performing various media content processing operations, typically with respect to images, audio, or video received within the payload of a message or other content item at the messaging application system 122. The media content processing system 124 may access one or more data storages (e.g., the database(s) 118) to retrieve stored data to use in processing media content and to store results of processed media content.

The social network system 126 supports various social networking functions and services, and makes these functions and services available to the messaging application system 122. To this end, the social network system 126 maintains and accesses an entity graph within the database(s) 118. Examples of functions and services supported by the social network system 126 include the identification of other users of the client application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The AR content tracking system 128 may be used to determine characteristics of users of augmented reality (AR) content 130. The AR content 130 may be produced by creators of augmented reality content using a platform of a service provider that at least one of maintains, develops, or implements the client application 102 and the server system 108. The AR content 130 may include a number of AR content items 132. Individual AR content items 132 may include computer-readable instructions that are executable to modify user content captured by the client device 102. In various examples, the server system 108 may provide one or more user interfaces that may be used to create the AR content 130. For example, the server system 128 may provide one or more user interfaces to import content that may be used to create one or more of the AR content items 132. To illustrate, the server system 108 may provide one or more user interfaces to import at least one of image content, video content, or audio content that may be used to generate an AR content item 132. The server system 108 may also provide one or more user interfaces with one or more creative tools that may be used to create one or more of the AR content items 132. In one or more illustrative examples, the server system 108 may implement at least one of a drawing tool, a writing tool, a sketching tool, or a coloring tool that may be used to generate the AR content 130.

The AR content tracking system 128 may enable a creator of an AR content item 132 to specify characteristics of a target audience for the AR content item 132. For example, a creator of the AR content item 132 may select one or more characteristics included in profiles of users of the client application 104 to include in a target audience of the AR content item 132. During the creation of the AR content item 132, the characteristics of the target audience specified by the creator of the AR content item 132 may be used by the AR content tracking system 128 to generate a user tracking component 134 of the AR content item 132 that determines whether characteristics of users of the client application 102 that interact with the AR content item 132 correspond to the characteristics of the target audience of the AR content item 132. The user tracking component 134 may store metrics related to the usage of the AR content item 132 in relation to the characteristics of the target audience of the AR content item 132 as tracked user data 136.

The metrics related to usage of the AR content item 132 may be determined using user profile data 138. The user profile data 138 may indicate one or more characteristics of individual users of the client application 104. For example, the user profile data 138 may indicate at least one of demographic information or location information of users of the client application 104. The user profile data 138 may also indicate content usage characteristics of users of the client application 104. The content usage characteristics may indicate sources of content consumed by users of the client application 104. The content usage characteristics may also indicate types of augmented reality content interacted with by users of the client application 104. Further, the content usage characteristics may indicate individual AR content items that are interacted with by users of the client application 104. In one or more examples, the content usage characteristics may indicate a frequency of interaction with at least one of one or more sources of content or types of content by users of the client application 104.

In one or more implementations, as users of the client application 104 interact with the AR content item 132, the user tracking component 134 may access user profile data 136 of the users. The user tracking component 134 may analyze user profile data 136 of the users of the client application 104 that interact with the AR content item 136 with respect to the characteristics of the target audience of the AR content item 136. In situations where a user of the client application 102 that interacts with the AR content item 132 has a characteristic that corresponds to a characteristic of the target audience for the AR content item 132, the user tracking component 134 may update the tracked user data 136 to indicate that a user of the client application 104 having the characteristic interacted with the AR content item 132. For individual users of the client application 104 that interact with the AR content item 132, the user tracking component 134 may analyze the user profile data 138 for the individual users with respect to individual characteristics of the target audience. In one or more illustrative examples, the tracked user data 136 may indicate a count for individual characteristics of the target audience for the AR content item 132. In these scenarios, in response to the user tracking component 136 determining that a user of the client application 104 that interacted with the AR content item 132 has a characteristic of the target audience of the AR content item 132, the AR tracking component 134 may increment the count included in the tracked user data 136 in relation to the characteristic.

The AR content tracking system 128 may obtain, characteristics of users of the client application 104 that interacted with the AR content item 132 from the user tracking component 134. The AR content tracking system 128 may store metrics related to the characteristics of users of the client application 102 that interact with the AR content item 132 as AR content usage data 140. In one or more examples, the AR content tracking system 128 may obtain counts related to characteristics of the target audience of the AR content item 132 from the user tracking component 134 and store the counts as at least a portion of the AR content usage data 140. In additional examples, the AR content tracking system 128 may analyze information obtained from the user tracking component 134 to determine one or more metrics related to users of the client application 104 that interact with the AR content item 132. For example, the AR content tracking system 128 may perform one or more analyses of information obtained from the user tracking component 132 to determine probabilities of users of the client application 104 having one or more characteristics interacting with the AR content item 132. The AR content tracking system 128 may also perform one or more analyses of information obtained from the user tracking component 132 to determine distributions with respect to characteristics of users of the client application 104 that interact with the AR content item 132. To illustrate, the AR content tracking system 128 may analyze information obtained from the user tracking component 134 to determine an average age of users of the client application 104 that interact with the AR content item 132, a percentage of users of the client application 104 that interact with the AR content item 132 that are female, or a frequency with which users of the client application 104 having one or more characteristics interact with the AR content item 132.

In one or more examples, one or more instances of the AR content item 132 may be executed by one or more instances of the client application 104 that correspond to one or more client devices 102. For example, an instance of the AR content item 132 may be provided to a first user of the client application 102 in response to a search request for augmented reality content that corresponds to one or more keywords. In an additional example, the AR content item 132 provided to a second user of the client application 102 by a third user of the client application 104 sharing the AR content item 132 with the second user. In these situations a first instance of the AR content item 132 that is provided to the first user may have a first instance of the user tracking component 134 and the second instance of the AR content item 132 that is provided to the second user in response to sharing of the AR content item 132 by the third user may have a second instance of the user tracking component 134. In these scenarios, as individual instances of the AR content item 132 are disseminated to different users of the client application 104, the respective instances of the user tracking component 134 may update the respective tracked user data 136 corresponding to interactions with the individual instances of the AR content item 132. Further, the AR content tracking system 128 may aggregate the tracked user data 136 from the individual instances of the user tracking component 134 that correspond to respective instances of the AR content item 132.

In one or more illustrative examples, an instance of the AR content item 132 may be accessed by a user of the client application 104 and applied to user content that is captured via the client application 104. For example, at least one of image content, video content, or audio content may be captured using one or more input devices of the client device 102. The user of the client application 104 may then provide input to apply the AR content item 132 to the user content. In various examples, applying the AR content item 132 to the user content may include modifying an appearance of one or more objects included in the user content. Based on applying the AR content item 132 to the user content, the user tracking component 134 of the AR content item 132 may analyze user profile data 138 of the user in relation to the characteristics of the target audience for the AR content item 132. In instances where the user tracking component 134 determines that a characteristic of the user corresponds to a characteristic of the target audience, the user tracking component 134 may update the tracked user data 136 associated with the instance of the AR content item 132. In various examples, the user tracking component 134 may report the tracked user data 136 to the AR content tracking system 138, such as on a periodic basis. In additional examples, the AR content tracking system 128 may send a request to the user tracking component 134 to provide at least a portion of the tracked user data 136 for the instance of the AR content item 132.

Continuing with the example from above, the user of the client application 104 that interacted with the instance of the AR content item 132 may implement the client application 104 to share the AR content item 132 with an additional user of the client application 104. For example, the user of the client application 104 may use the client application 104 to generate a message that includes information that may be used to access the AR content item 132 and apply the AR content item 132 to user content of the additional user of the client application 104. In one or more examples, the additional user of the client application 104 may implement the client application 104 to apply the AR content item 132 to user content of the additional user. In these scenarios, the user tracking component 134 of the instance of the AR content item 132 shared with the additional user may analyze the user profile data 138 of the additional user with respect to characteristics of a target audience for the AR content item 132. The user tracking component 134 may then update the tracked user data 136 for the instance of the AR content item 132 in situations where one or more characteristics of the additional user correspond to one or more characteristics of the target audience of the AR content item 132. In this way, as the instance of the AR content item 132 is shared among users of the client application 104, the user tracking component 134 may continue to update the tracked user data 136 in relation to the characteristics of the users of the client application 104 that are implementing the AR content item 132 and characteristics of a target audience of the AR content item 132 specified by a creator of the AR content item 132.

After an augmented reality content item 132 has been shared with a user of the client application 104, the implementation of the AR content item 132 with respect to user content of the user may be referred to as "unlocking." In various examples, one or more restrictions may be placed on the access to the AR content item 132, such as an age restriction or a geographic restrictions. In these situations, a check may be performed with respect to the user profile data 138 of a user of the client application 104 requesting access to the AR content item 132 to determine whether the characteristics of the user comply with the one or more restrictions related to the AR content item 132. In one or more examples, after the AR content item 132 has been accessed by a user of the client application 104, the AR content item 132 may be added to an augmented reality content item collection for the user.

Further, a user of the client application 104 may obtain multiple instances of the AR content item 132 from different sources. To illustrate, a user of the client application 104 may obtain a first instance of the AR content item 132 from an additional user of the client application 104 that shared the instance of the AR content item 132 with the user. Additionally, the user of the client application 104 may obtain a second instance of the AR content item 132 from a list of recommended augmented reality content items directed to the user as part of a campaign by the creator of the client application 104. In these situations, the instances of the AR content item 132 may be reduced to a single instance of the AR content item 132 being available to the user of the client application 104. In one or more examples, priority may be given to the instance of the AR content item 132 that was provided to the user of the client application 104 as part of the campaign by the creator of the AR content item 132. In these situations, the instance of the AR content item 132 that was shared with the user of the client application 104 may be removed from a collection of augmented reality content items of the user.

Figure 2:
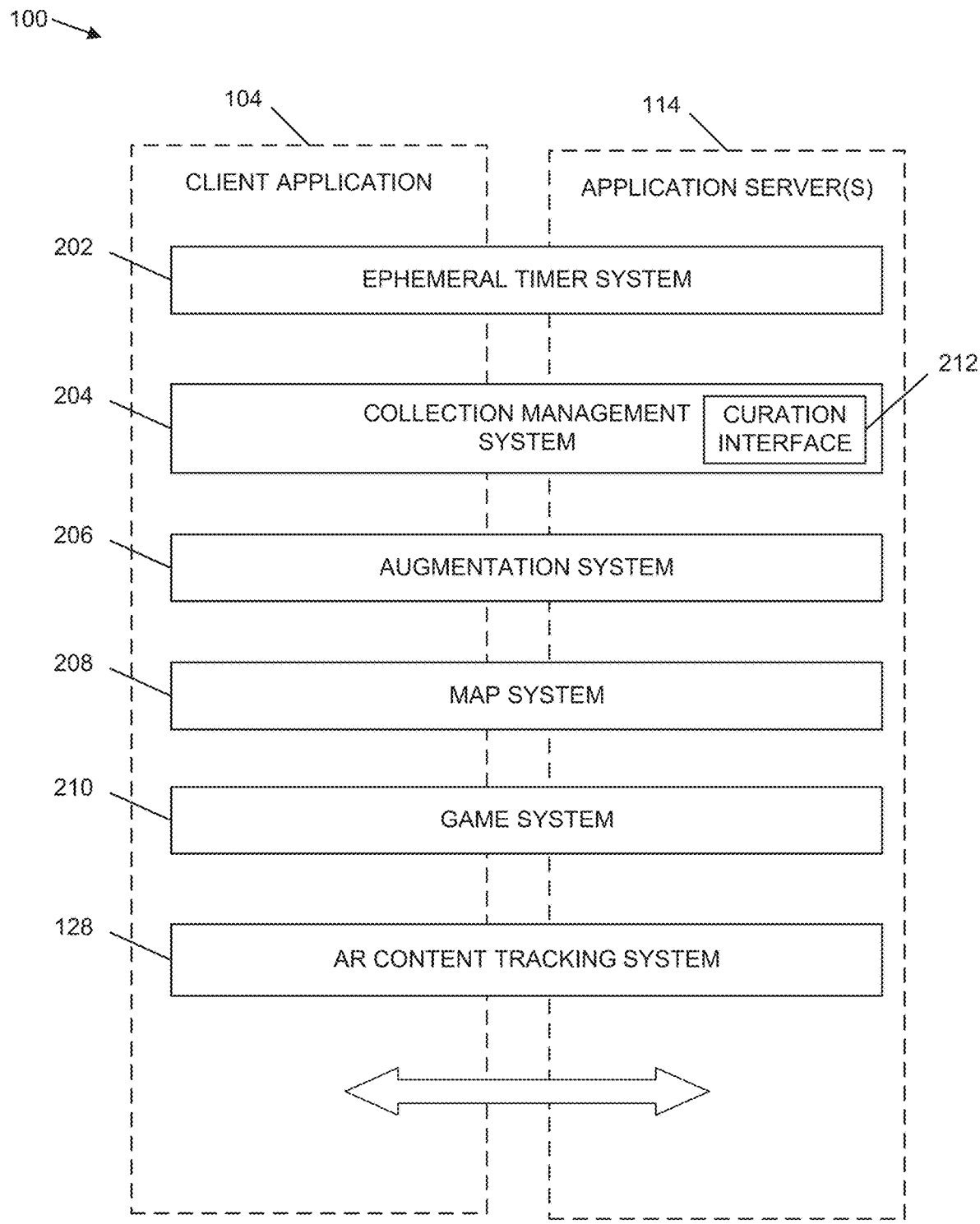
FIG. 2 is a diagrammatic representation of a system, in accordance with some examples, that may have both client-side and server-side functionality.

FIG. 2 is a block diagram illustrating further details regarding the server system 108, according to some examples. Specifically, the server system 108 is shown to comprise the client application 104 and the application servers 114. The server system 108 embodies a number of subsystems, which are supported on the client-side by the client application 104 and on the sever-side by the application servers 114. These subsystems include, for example, an ephemeral timer system 202, a collection management system 204, an augmentation system 206, a map system 208, a game system 210, and the AR content tracking system 128.

The ephemeral timer system 202 is responsible for enforcing the temporary or time-limited access to content by the client application 104 and the messaging application system 122. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 108. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 118 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 108 from a specific geographic location may be displayed within the context of a map at that particular location to "friends" of a specific user on a map interface of the client application 104. A user can furthermore share his or her location and status information (e.g., using an appropriate status avatar) with other users of the server system 108 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 108. The server system 108 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The AR content tracking system 128 may determine an amount of usage of augmented reality content items. In various examples, the AR content tracking system 128 may obtain data from a number of user tracking components of individual instances of AR content items to determine an amount of usage for AR content items with respect to users of the client application 104 that have one or more characteristics.

Figure 3:
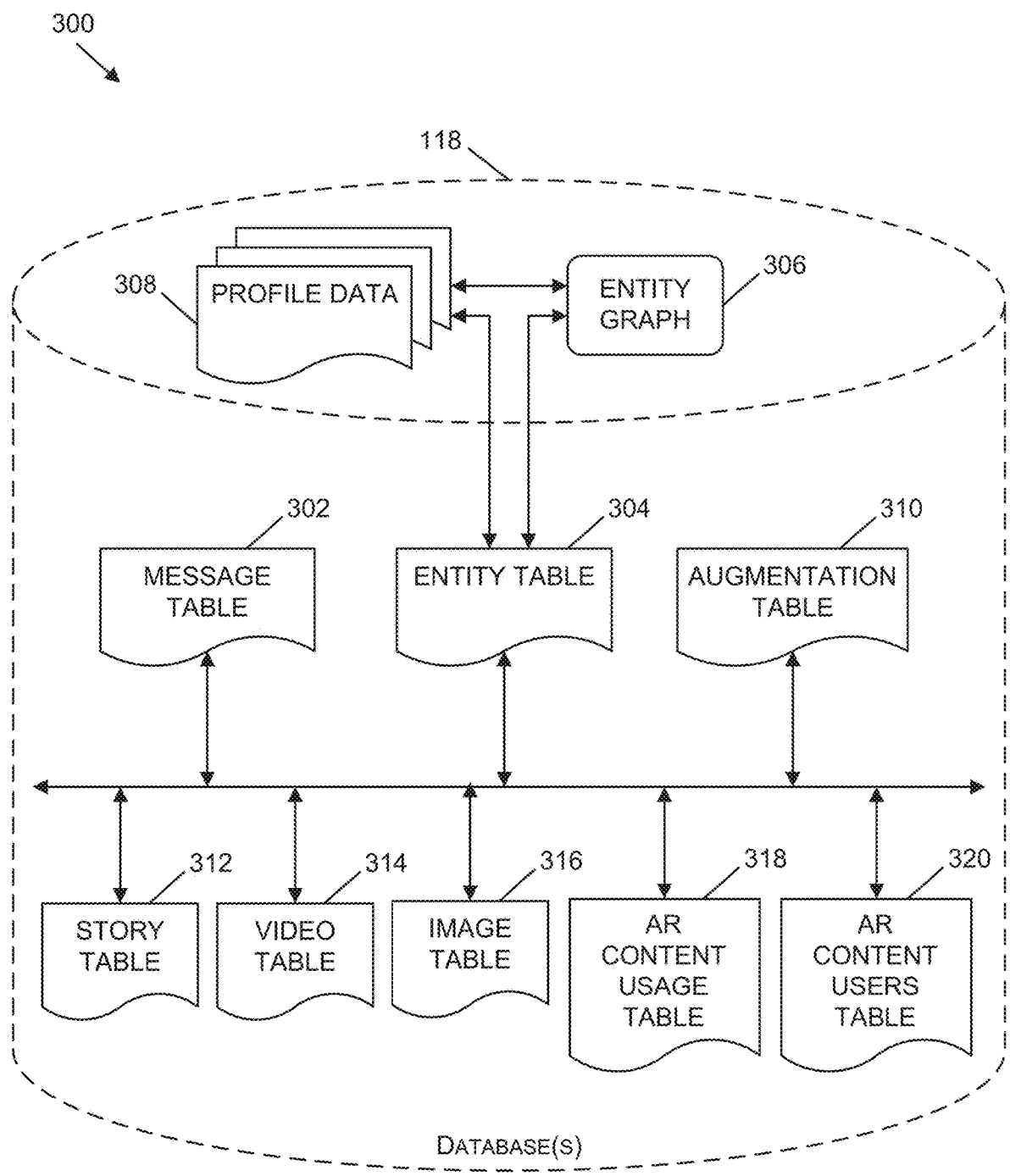
FIG. 3 is a schematic diagram illustrating data that may be stored in a database of a server system, according to one or more example implementations.

FIG. 3 is a schematic diagram illustrating data structures 300 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 118 may also store an AR content usage table 318 that stores data indicating usage metrics for augmented reality content. In various examples, the AR content usage table 318 may include one or more data structures that store usage metrics for individual augmented reality content items. The metrics may indicate a number of interactions with augmented reality content by users of the client application 104. In addition, the database(s) 118 may store an AR content users table 320 that indicates characteristics of users of the client application 104 that interact with augmented reality content via the client application 104. The AR content users table 320 may include one or more identifiers of users of the client application 104 that interact with one or more augmented reality content items. The one or more identifiers may be used to access profile information of the users of the client application 104 that interact with augmented reality content using the client application 104. In one or more examples, the AR content users table 320 may store at least a portion of the profile information of users of the client application 104 that interact with augmented reality content via the client application 104.

Figure 4:
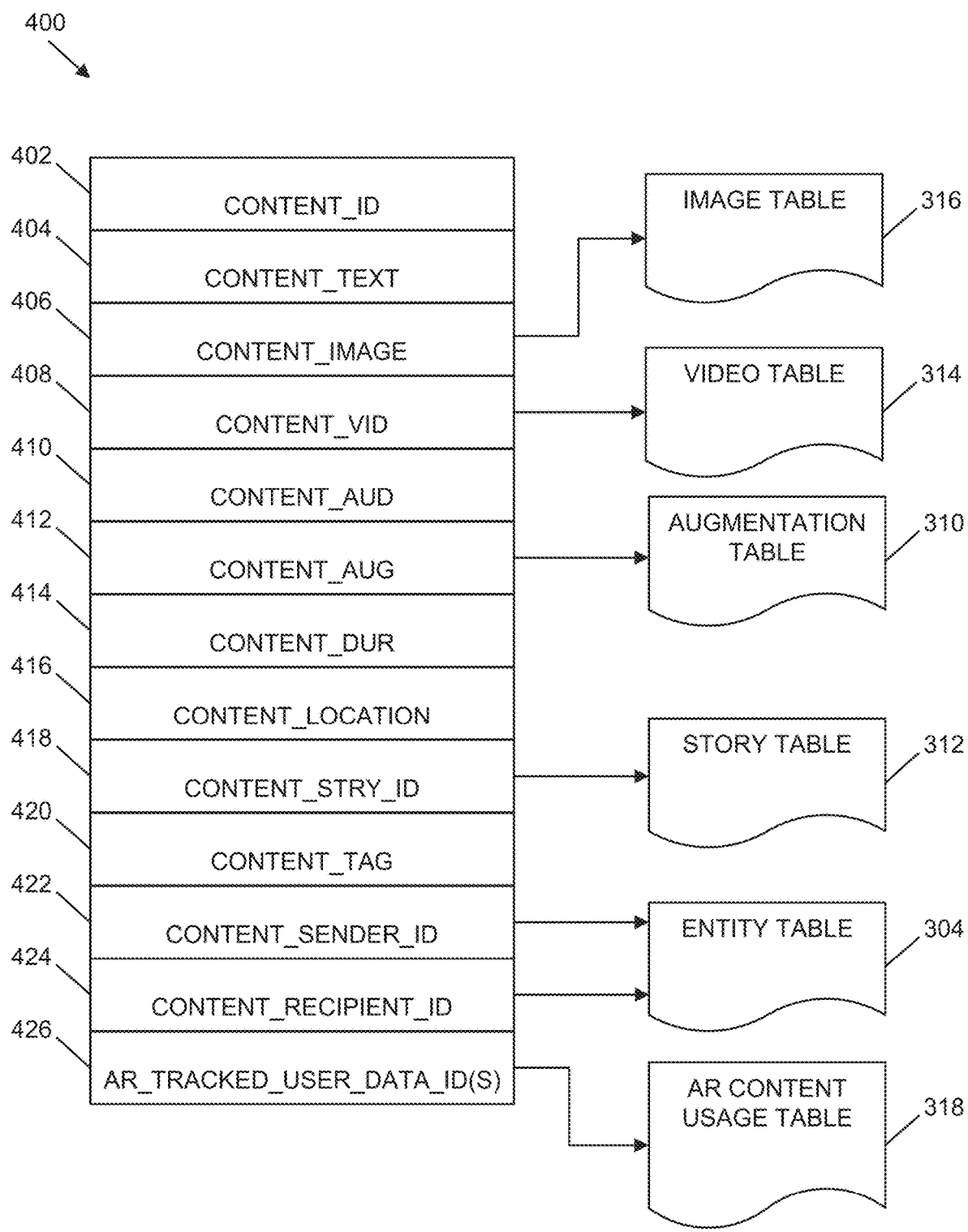
FIG. 4 is a schematic diagram illustrating an example framework for content that may be accessible via a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 108. In situations where the content 400 includes a message, the content 400 may be used to populate the message table 302 stored within the database(s) 118 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for a sent or received content 400 may be stored in the image table 316.

content video payload 408: video data, captured by a camera component or retrieved from a memory component of the client device 102, and that is included in the content 400. Video data for a sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

AR tracked user data identifier(s) 426: an identifier of features of users of the client application 104 that interact with augmented reality content items. The features may correspond to a target audience of an augmented reality content item that is implemented with respect to the content 400.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentation data 412 may point to data stored in an augmentation table 310, values stored within the content story identifier 418 may point to data stored in a story table 312, and values stored within the content sender identifier 422 and the content receiver identifier 424 may point to user records stored within an entity table 304. Further, values of the AR tracked user data identifier(s) 426 may point to data stored within a data structure that includes the AR content usage table 318. In these scenarios, the data stored in the AR content usage table 318 for a respective AR tracked user data identifier 426 may correspond to a feature of a target audience for an augmented reality content item applied to the content 400.

Figure 5:
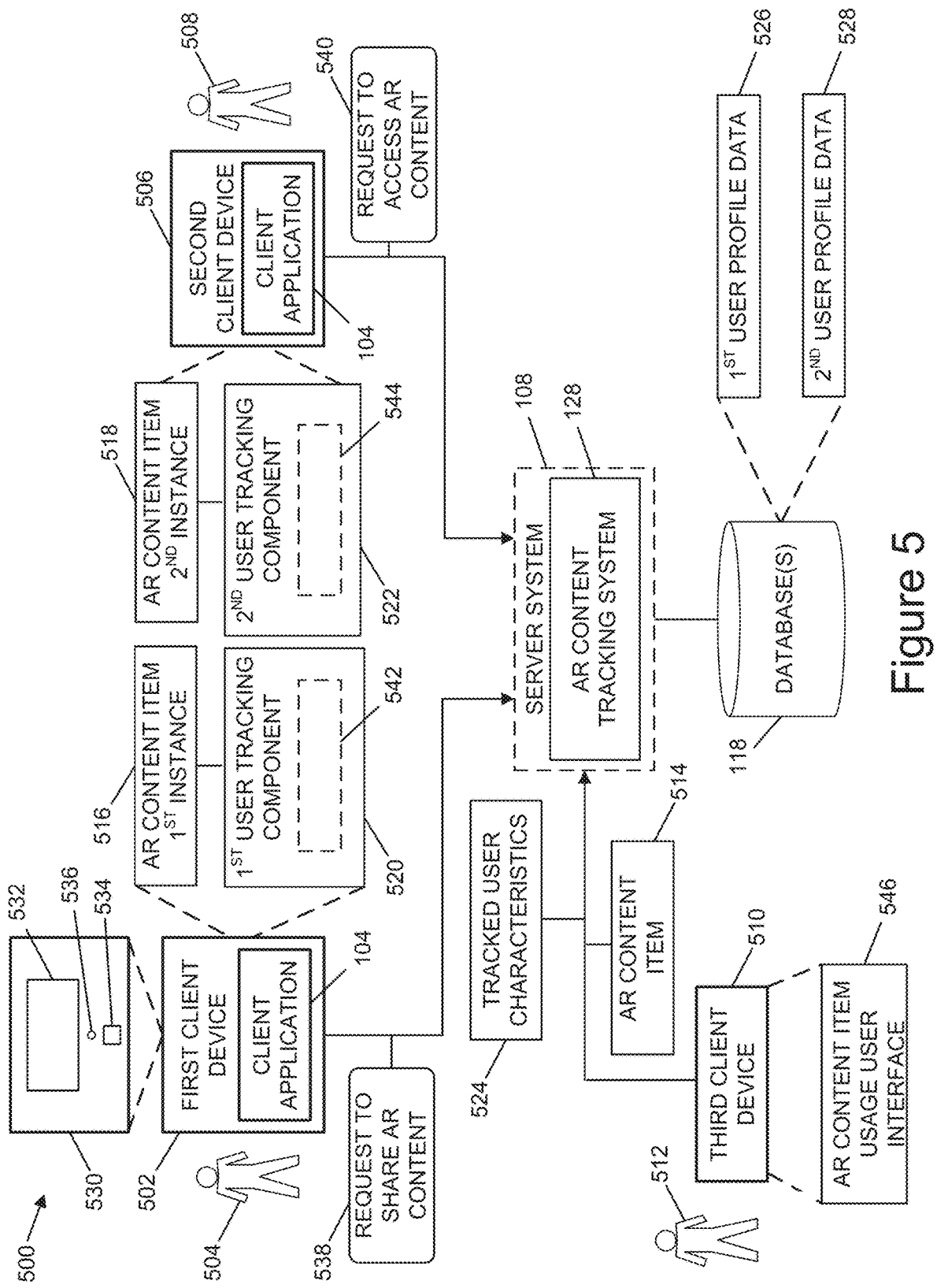
FIG. 5 is a diagram of an architecture to track the usage of augmented reality content items, according to one or more example implementations.

FIG. 5 is a diagram of an architecture 500 to track the usage of augmented reality content items, according to one or more example implementations. The architecture 500 may include the AR content tracking system 128 that is included in the server system 108 of FIG. 1. Additionally, the architecture 500 also includes the one or more databases 118 in communication with the AR content tracking system 128. The architecture 500 may also include a first client device 502 operated by a first user 504 and a second client device 506 operated by a second user 508. The first user 504 and the second user 508 may have accounts with the client application 104. In one or more examples, the first user 504 and the second user 508 may be connections with one another in relation to the client application 104. For example, the first user 504 may be included in a social graph of the second user 508 and the second user 508 may be included in a social graph of the first user 504. The architecture 500 may also include a third client device 510 that is operated by a third user 512. The third user 512 may be an individual user of the client application 104 or an entity that generates augmented reality content for use within the client application 104. The third user 512 may be a creator of augmented reality content that is implemented by the client application 104. For example, the third user 512 may create an augmented reality (AR) content item 514 that may be implemented by the client application 104. In various examples, the AR content item 514 may be made available to users of the client application 104 and users may select the AR content item 514 to be associated with accounts of the client application 104.

In the illustrative example of FIG. 5, the first user 504 may be associated with an AR content item first instance 516 and the second user 508 may be associated with an AR content item second instance 518. In one or more examples, the AR content item 514 may be presented in a group of AR content items and the first user 504 may select the AR content item 514 from the group of AR content items. Additionally, the second user 508 may also select the AR content item 514 from the group of AR content items. As a result, the AR content item 514 may be available for use by the first user 504 via an instance of the client application 104 executed by the first client device 502 and available for use by the second user 508 via an instance of the client application 104 executed by the second client device 506. In various examples, at least a portion of computer-readable instructions corresponding to the AR content item first instance 516 may be stored by the first client device 502 and at least a portion of computer-readable instructions corresponding to the AR content item second instance 518 may be stored by the second client device 506. In one or more additional examples, at least a portion of the computer-readable instructions corresponding to the AR content item first instance 516 and the AR content item second instance 518 may be stored by the database 118.

The AR content item first instance 516 may be associated with a first user tracking component 520 and the AR content item second instance 518 may be associated with a second user tracking component 522. The first user tracking component 520 may track an amount of usage of the AR content item first instance 516 by the first user 504 and the second user tracking component 522 may track an amount of usage of the AR content item second instance 518 by the second user 508. For example, the first user tracking component 520 may determine a number of times that the AR content item first instance 516 is applied to user content generated by the first user 504 using the client application 104 and the second user tracking component 522 may determine a number of times that the AR content item second instance 518 is applied to user content generated by the second user 508 using the client application 104. In one or more additional examples, the first user tracking component 520 may determine at least one of a number of times that the AR content item first instance 516 is shared by the first user 504 or a number of times that the AR content item first instance 516 is included in a message generated by the first user 504 that is communicated to additional users of the client application 104. Further, the second user tracking component 522 may determine at least one of a number of times that the AR content item second instance 518 is shared by the second user 508 or a number of times that the AR content item second instance 518 is included in a message generated by the second user 508 that is communicated to additional users of the client application 104.

The first user tracking component 520 may include computer-readable instructions that are stored by the first client device 502 and the second user tracking component 522 may include computer-readable instructions that are stored by the second client device 506. In one or more additional examples, the one or more databases 118 may store computer-readable instructions that correspond to the first user tracking component 520 and computer-readable instructions that correspond to the second user tracking component 522. In various examples, computer-readable instructions of the first user tracking component 520 may be embedded in computer-readable instructions of the AR content item first instance 516 and computer-readable instructions of the second user tracking component 522 may be embedded in computer-readable instructions of the AR content item second instance 518.

Additionally, the first user tracking component 520 may determine characteristics of the first user 504 and the second user tracking component 522 may determine characteristics of the second user 508. In one or more examples, the AR content tracking system 128 may obtain tracked user characteristics 524 from the third user 512. The tracked user characteristics 524 may correspond to characteristics of users of the client application 104 that the third user 512 is interested in collecting and analyzing. For example, the tracked user characteristics 524 may correspond to a target audience of the AR content item 514. In various examples, the tracked user characteristics 524 may be selected from a group of user characteristics provided by the AR content tracking system 128 to the third user 512 via the third client device 510. In one or more illustrative examples, the tracked user characteristics 524 may include at least one of demographic information, location information, content consumption information, purchase history, user activity information, or AR content item usage information.

The first user tracking component 520 may include computer-readable instructions that are executable to obtain information related to the first user 504 that corresponds to the tracked user characteristics 524. In one or more examples, the first user tracking component 520 may obtain characteristics of the first user 504 that correspond to the tracked user characteristics 524 from first user profile data 526 stored by the one or more databases 118. Additionally, the second user tracking component 522 may obtain characteristics of the second user 508 that correspond to the tracked user characteristics 524 from second user profile data 528 stored by the one or more databases 118.

In one or more illustrative examples, the first user 504 may select the AR content item 514 from a group of AR content items. In response to selection of the AR content item 514, the AR content item first instance 516 may be associated with an account for the client application 104 of the first user 504. Computer-readable instructions of the AR content item first instance 516 may be executable to modify user content generated by the first user 504 using the client application 104. For example, the AR content item first instance 516 may be implemented to modify an appearance of one or more objects included in at least one of image content or video content captured by the first client device 502 using the client application 104. Additionally, after selection of the AR content item 514 by the first user 504, the first user tracking component 520 may provide one or more queries to the one or more databases 118 to obtain information from the first user profile data 526 that corresponds to the tracked user characteristics 524. To illustrate, the first user tracking component 520 may include one or more rules, one or more schemas, one or more pre-built queries, or one or more combinations thereof, that cause the user tracking component 520 to retrieve information from the first user profile data 526 that corresponds to the tracked user characteristics 524 provided by the third user 512. In various examples, the first user tracking component 520 may retrieve additional information from the first user profile data 526 as the information included in the first user profile data 526 is at least one of modified or updated.

In one or more examples, a user tracking component that corresponds to the AR content item 514 may be advanced from one user of the client application 104 to another user of the client application 104 that has shared the AR content item 514. In these scenarios, an instance of the user tracking component may be instantiated each time that a user of the client application 104 selects the AR content item 514 to be added to a library of AR content items of the user and the user tracking component may be passed along as the user at least one of shares the AR content item 514 or communicates user content modified by implementing the AR content item in relation to the user content. For example, the first client device 502 may cause the client application 104 to display one or more user interface elements that individually correspond to respective AR content items. To illustrate, individual augmented reality content items may correspond to a respective icon that is selectable to implement the features of AR content item 514. In one or more illustrative examples, the client application 104 may display a user interface 530 that includes user content 532 and a user interface element 534 that corresponds to the AR content item 514. In various examples, selection of the user interface element 534 may cause the AR content item first instance 516 to be applied to the user content 532. Additionally, the user interface element 534 may be selectable to share the AR content item 514 with an additional user of the client application 104. In one or more further examples, the user interface 530 may include an additional user interface element 536 that is selectable to share the augmented reality content item 514 with an additional user of the client application 104.

In one or more illustrative examples, the first user 504 may select at least one of the user interface element 534 or the additional user interface element 536 to share the augmented reality content item 514 with the second user 508. In response to selection of at least one of the user interface element 534 or the additional user interface element 536, a request to share AR content 538 may be generated and sent to the server system 108. The server system 108 may then make the AR content item 514 available for use by the second user 508 via the client application 104. For example, a suggestion to obtain the AR content item 514 may be provided to the second user 508 via the client application 104. In the illustrative example of FIG. 5, the second user 508 may select the AR content item 514 for use and a request to obtain the AR content 540 may be sent from the second client device 506 to the server system 108. The AR content item second instance 518 may then be generated and the second user 508 may be enabled to implement the AR content item second instance 518 with respect to user content generated using the client application 104. In one or more additional examples, the AR content item 514 may be shared by the first user 504 with the second user 508 by communicating user content 532 that has been modified in accordance with the AR content item first instance 516 in a message from the first user 504 to the second user 508 via the client application 104. In these situations, the message may include one or more options that are selectable by the second user 508 to obtain the AR content item 514 and use the AR content item 514 in relation to user content generated by the second user 508 via the client application 104. The AR content item second instance 518 may be instantiated in response to the selection of an option to obtain the AR content item 514 that is included in the message sent to the second user 508 from the first user 504.

In various examples, in response to the AR content item 514 being shared by the first user 504 with the second user 508 and the second user 508 selecting the AR content item 514 for use, the second user tracking component 522 may be generated. In one or more examples, the second user tracking component 522 may be a subsequent version of the first user tracking component 520. For example, the second user tracking component 522 may retrieve information related to the tracked user characteristics 524 from the second user profile data 528 and store the information in conjunction with additional information retrieved from the first user profile data 526 in relation to the tracked user characteristics. In this way, the user tracking components 520, 522 may be repositories that cumulatively retrieve and store information for users of the client application 104 as the AR content item 510 is shared. Thus, each time that the AR content item 514 is shared between users of the client application 104, a corresponding user tracking component may add information for a new user to information previously obtained from user profile data of previous users that corresponds to the tracked user characteristics 524. To illustrate, the first user tracking component 520 may store first user characteristics data 542. The first user characteristics data 542 may indicate characteristics of the first user 504 that correspond to the tracked user characteristics 524, In one or more illustrative examples, the tracked user characteristics 524 may include age of users of the client application 104 between 20-30 years old, location of users of the client application 104 including a group of postal codes, and time since first use of the client application 104 greater than 6 months. The first user characteristics data 542 may indicate whether the first user 504 corresponds to the tracked user characteristics 524. In one or more examples, the first user characteristics data 542 may indicate values for the tracked user characteristics 524. In one or more additional examples, the first user characteristics data 542 may include a tag or other identifier indicating whether the first user 504 corresponds to one or more of the tracked user characteristics 524. In one or more further examples, the first user characteristics data 542 may indicate a count related to the tracked user characteristics 524.

In response to the AR content item 514 being shared by the first user 504 with the second user 508, the first user characteristics data 542 may be passed along and be an initial version of the second user characteristics data 544. The second user characteristics data 544 may be updated to include information related to the second user 508 that corresponds to the tracked user characteristics 524. Thus, as the AR content item 514 is shared by additional users of the client application 104, the user tracking component is updated to indicate information of the users that correspond to the tracked user characteristics 524. Continuing with the previous illustrative example from above regarding the tracked user characteristics 524, at a given time, a tracking component that initially began with the first user 504 may be updated to indicate ages of users of the client application 104 that have accessed a version of the AR content item 514 initially accessed by the first user 504 and shared with the second user 508, locations of users of the client application 104 that have accessed a version of the AR content item 514 initially accessed by the first user 504 and shared with the second user 508, or an amount of time that users have been using the client application 104 that have accessed a version of the AR content item 514 initially accessed by the first user 504 and shared with the second user 508. In one or more additional examples, at a given time a version of the user tracking component related to the AR content item 514 may indicate a number of users of the client application 104 that accessed the AR content item 514 initially accessed by the first user 504 and shared with the second user 508 that satisfy the tracked user characteristics 524, such as at least one of a number of users of the client application 104 between the ages of 20-30, a number of users of the client application 104 located within the set of postal codes, or a number of users of the client application 104 that have been using the client application 104 for a threshold period of time.

In one or more examples, the third user 512 may access an AR content item usage user interface 546 that indicates characteristics of users of the client application 104 that at least one of access or use the AR content item 514. In various examples, the AR content item usage user interface 546 may indicate characteristics of users of the client application 104 that access the AR content item 514 and that correspond to the tracked user characteristics 524. The AR content item usage user interface 546 may also indicate a frequency of use of the AR content item 514 by users of the client application 104 that have characteristics that correspond to the tracked user characteristics 524.

The information displayed by the AR content item usage user interface 546 may be obtained from at least one of the first user tracking component 520 or the second user tracking component 522. In one or more examples, the first user tracking component 520 may send the first user characteristics data 542 to the server system 108 and the second user tracking component 522 may send the second user characteristics data 544 to the server system 108 periodically. In one or more additional examples, the first user tracking component 520 may send the first user characteristics data 542 to the server system 108 and the second user tracking component 522 may send the second user characteristics data 544 to the server system 108 in response to a request from the AR content tracking system 128.

In one or more implementations, multiple instances of the AR content item 514 may be associated with the accounts of the users of the client application 104. For example, the first user 504 may obtain a first instance of the AR content item 514 from a first source and a second instance of the AR content item 514 from a second source. In these situations, the sources from which the AR content item 514 may be obtained may be prioritized. For example, a first source of the AR content item 514 may be a promotion for the AR content item 514 that is sponsored by the third user 512 and a second source of the AR content item 514 may be a suggestion made by the server system 108 based on usage of the AR content item 514 by connections of the first user 504. In one or more illustrative examples, the first source may have a higher priority than the second source. In these scenarios, the instance of the AR content item 514 that corresponds to the second source may be removed from the account of the first user 504 such that the AR content item 514 is applied to user content of the first user 504 in relation to the instance of the AR content item 514 that corresponds to the first source. In this way, duplicates of instances of the AR content item 514 may be removed from accounts of users of the client application 104 and minimize the memory resources used to store and implement the AR content item 514. In various examples, a source of the AR content item 514 for which a user tracking component is implemented may have a higher priority than other instances of an AR content item 514 for which a user tracking component is not implemented.

Figure 6:
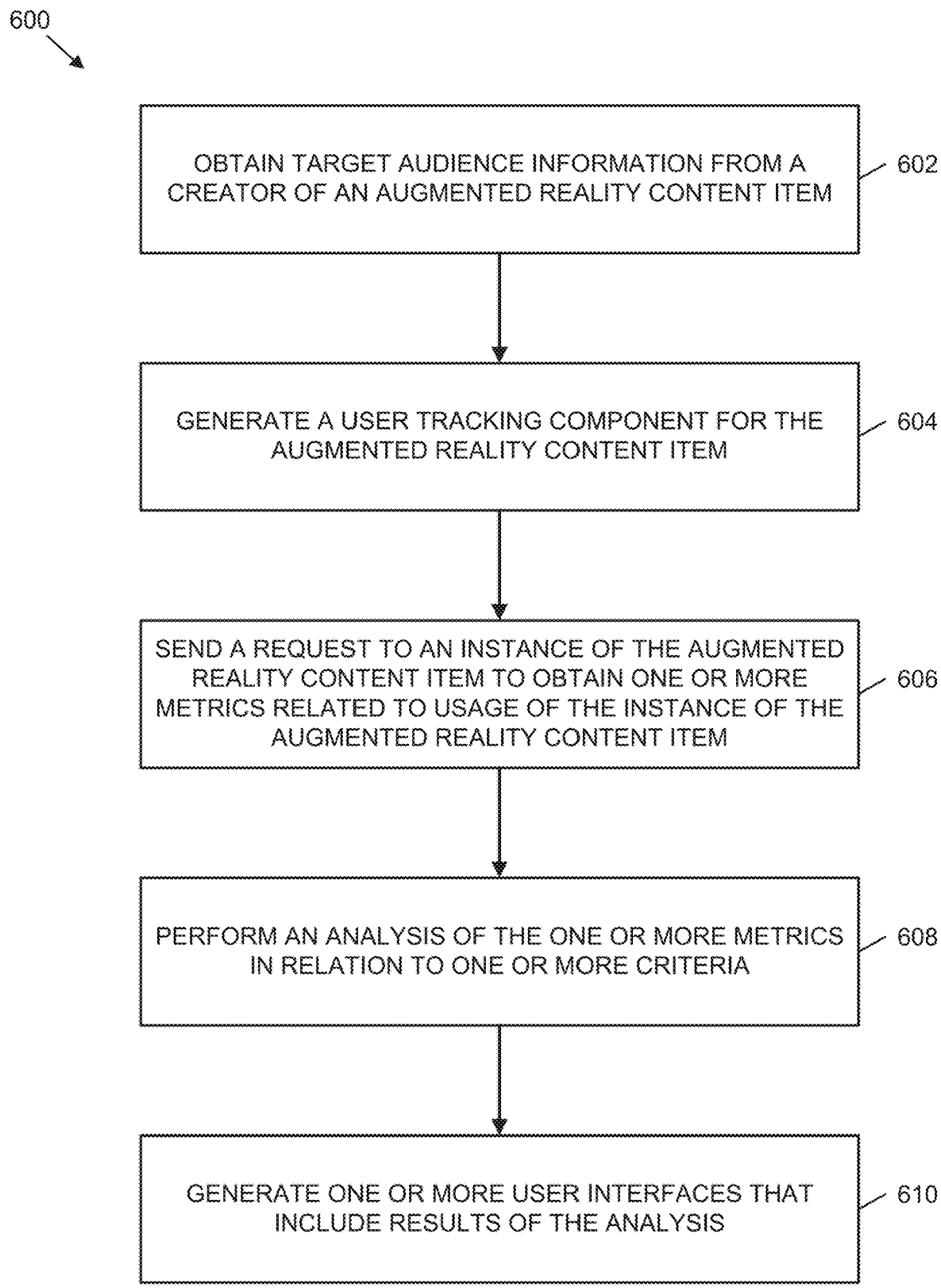
FIG. 6 is a flowchart illustrating example operations of a process to track usage of augmented reality content items, according to one or more example implementations.

FIG. 6 illustrates a flowchart of one or more implementations of a process to collect and analyze augmented reality content usage data. The processes may be embodied in computer-readable instructions for execution by one or more processors such that the operations of the processes may be performed in part or in whole by the functional components of at least one of the client application 104 or the server system 108. Accordingly, the processes described below are by way of example with reference thereto, in some situations. However, in other implementations, at least some of the operations of the processes described with respect to FIG. 6 may be deployed on various other hardware configurations. The processes described with respect to FIG. 6 are therefore not intended to be limited to the server system 108 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 to track usage of augmented reality content items, according to one or more example implementations. The process 600 may include, at operation 602, obtaining target audience information from a creator of an augmented reality content item. The target audience information may indicate one or more characteristics of a target audience that the creator would like to reach with the augmented reality content item. In one or more implementations, the target audience information may be provided via a portal that may be used by the creator of the augmented reality content item to specify the one or more characteristics.

At 604, the process 600 may include generating a user tracking component for the augmented reality content item. The user tracking component may include computer-readable instructions that are executable to analyze profile data of users of the client application that interact with the augmented reality content item. Individual instances of the augmented reality content item may include a respective instance of the user tracking component. In various examples, the user tracking component may analyze one or more characteristics of a user of the client application that interacted with the augmented reality content item with respect to one or more characteristics of the target audience. Additionally, the user tracking component may update a metric corresponding to a characteristic of the one or more characteristics in response to determining that user profile data of the user corresponds to the characteristic.

Additionally, the process 600 may include, at operation 606, sending a request to an instance of the augmented reality content item to obtain one or more metrics related to usage of the instance of the augmented reality content item. The one or more metrics may indicate a number of users of the client application having respective characteristics of the target audience that access the augmented reality content item. In one or more examples, the user tracking component may be encrypted. In these scenarios, the request may include information to decrypt the user tracking component to obtain the one or more metrics.

In one or more examples, augmented reality content may be shared by users of the client application. That is, a first user of the client application may share the augmented reality content item with a second user of the client application. In various examples, in response to a request to share an augmented reality content item, message content may be generated that includes information to access the augmented reality content item. The message content may be sent to a client device of a user of the client application that is a recipient of the augmented reality content item. In one or more illustrative examples, one or more restrictions may be associated with the augmented reality content item that places one or more limits on the users of the client application that may access the augmented reality content item. To illustrate, a server system may receive a request from a client device of the recipient of the augmented reality content item to access the augmented reality content item. The server system may analyze characteristics of the recipient of the augmented reality content item with respect to the one or more restrictions. In situations where characteristics of the recipient do not satisfy the one or more restrictions, the augmented reality content item may be added to a collection of augmented reality content items of the recipient. In one or more additional illustrative examples, the one or more restrictions may include a first restriction that is related to age of users of the client application requesting to access the augmented reality content item. In one or more further illustrative examples, the one or more restrictions may include a second restriction that is related to geographic location of users of the client application requesting to access the augmented reality content item.

In one or more additional examples, the network system may analyze first characteristics of the recipient in relation to second characteristics of the target audience of the augmented reality content item before making an instance of the augmented reality content item accessible to a client device of the recipient. In one or more further examples, in situations where first characteristics of the recipient of the message content correspond to the second characteristics of the target audience of the augmented reality content item, the augmented reality content item may be presented to the recipient as a recommended augmented reality content item. The server system may also determine whether the augmented reality content item is a duplicate of another augmented reality content item associated with the account of the recipient. In scenarios where the augmented reality content item is a duplicate, one of the instances of the augmented reality content item may be removed from an account of the recipient based on a list of priorities corresponding to sources of augmented reality content items.

Further, at operation 608, the process 600 may include performing an analysis of the one or more metrics in relation to one or more criteria. The analysis may include determining statistical measures, such as average, standard deviation, and the like with respect to characteristics of users of the client application that access the augmented reality content item. In one or more examples, the analysis may determine a frequency with which users of the client application having one or more characteristics interact with the augmented reality content item. In various examples, tracked user data may be received from a plurality of user tracking components that individually correspond to a plurality of instances of the augmented reality content item that are being accessed by a number of users of the client application.

The tracked user data obtained from the plurality of user tracking components may be aggregated and analyzed with respect to the one or more metrics. In one or more additional examples, a single user tracking component may obtain information related to individual users of the client application that access different instances of the augmented reality content item as the augmented reality content item is being shared by users of the client application. In these situations, the user tracking component may be associated with a most recent user of the client application that has obtained the user content item in a chain of users of the client application that have shared the augmented reality content item with one another. In one or more examples, the tracked user data may be obtained from a plurality of user tracking components that correspond to a plurality of augmented reality content items. In various examples, at least a portion of the plurality of augmented reality content items may be generated by different creators of augmented reality content. In one or more additional examples, the user tracking component may be encrypted. In these situations, a request to access information from the user tracking component may include decryption information related to the user tracking component in order to access the data stored by the user tracking component.

Also, the process 600 may include, at operation 610, generating one or more user interfaces that include results of the analysis. The one or more user interfaces may be accessible to the creator of the augmented reality content item via a portal. The one or more user interfaces may indicate in graphical form statistics and metrics related to users of the client application that interact with the augmented reality content item.

Figure 7:
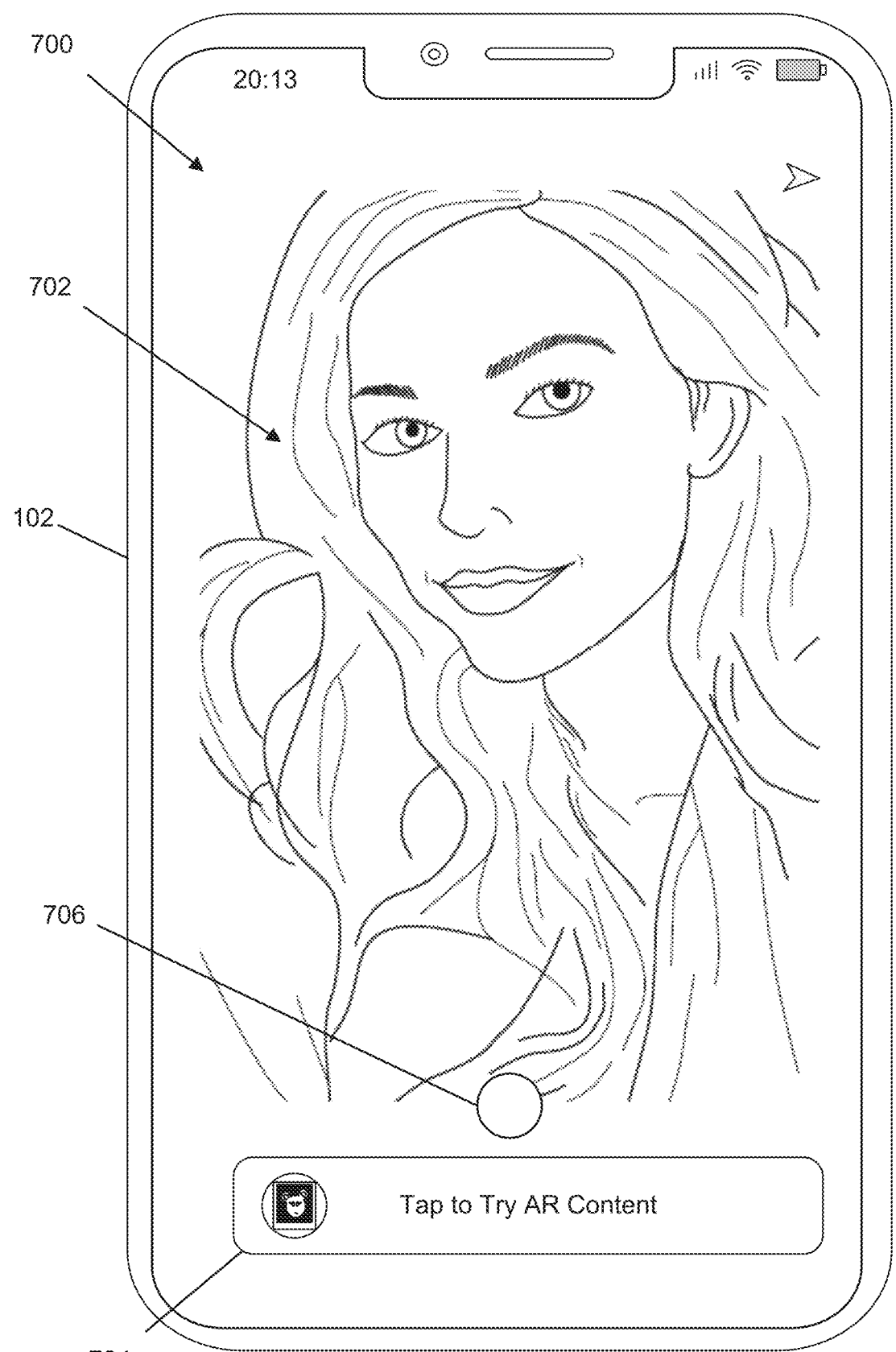
FIG. 7 is an illustration of a user interface that includes a message that may be used to share an augmented reality content item, according to one or more example implementations.

FIG. 7 is an illustration of a user interface 700 that includes a message that may be used to share an augmented reality content item, according to one or more example implementations. The user interface 700 may be displayed via a display device of the client device 102 and produced by a client application executed by the client device 102, such as the client application 104. In one or more examples, the user interface 700 may include content 702 that is included in the message. The content 702 may have been generated using the client application 104. In one or more illustrative examples, the content 702 may show an augmented reality content item applied to an image of a user of the client application 104. The user interface 700 may also include a user interface element 704 that is selectable to obtain user content of a recipient of the message and apply the augmented reality content item to the user content of the recipient. Selection of the user interface element 704 may unlock the augmented reality content item in relation to the recipient and add the augmented reality content item to a collection of augmented reality content items of the recipient. In various examples, the user interface 700 may include one or more additional user interface elements 706 that are selectable to share the AR content item with other users of the client application 104. Accessing the AR content item may cause information of the user of the client application 104 to be retrieved by a tracking component and made available to a creator of the AR content item.

Figure 8:
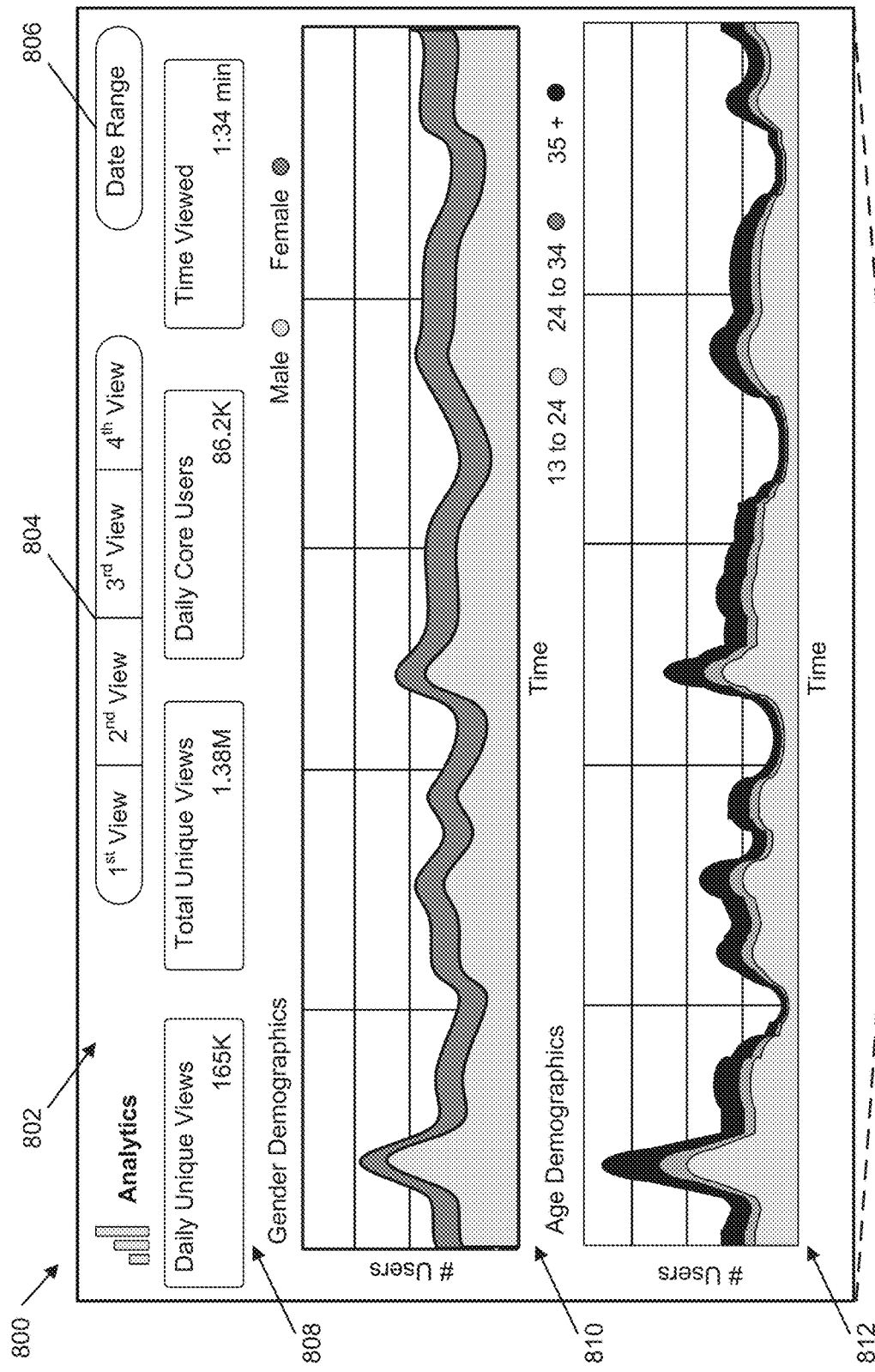
FIG. 8 is a representation of an environment that includes a client device that displays a user interface including information that characterizes users of a client application that interact with augmented reality content items according to one or more example implementations.
Figure 8:
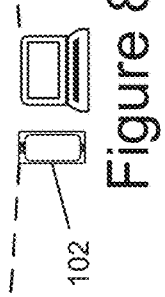

FIG. 8 is a representation of an environment 800 that includes a client device 102 that displays a user interface 802 including information that characterizes users of a client application that interact with augmented reality content items according to one or more example implementations. The user interface 802 may be displayed via a display device of the client device 102 and produced by a client application executed by the client device 102, such as the client application 104. In one or more examples, the client device 102 may be operated by an AR content creator or a representative of an AR content creator.

The user interface 802 may include a number of options 804 that are selectable to generate different views of information that indicate characteristics of users of the client application 104 that use one or more augmented reality content items to modify user content via the client application 104. The user interface 802 may also include a user interface element 806 that is operable to select a date range for information related to usage of one or more augmented reality content items. In addition, the user interface 802 may include a first section 808 that includes information related to usage metrics for one or more augmented reality content items, such as daily unique views of one or more augmented reality content items, total unique views of one or more augmented reality content items, daily core users of one or more augmented reality content items, and an average amount of time that users of the client application 104 viewed the one or more augmented reality content items. In various examples, a core user of an augmented reality content item may indicate a user of the client application 104 that uses an augmented reality content item at least a threshold number of times or for a threshold amount of time within a given period of time.

Further, the user interface 802 may include a second section 810 that indicates gender demographics over time related to the use of one or more augmented reality content items. The gender demographics may indicate a number of users of the client application 104 that use one or more augmented reality content items during a period of time and the respective gender of those users. Additionally, the user interface 802 may include a third section 812 that indicates age demographics over time related to the use of one or more augmented reality content items. The age demographics may indicate a number of users of the client application 104 that use one or more augmented reality content items during a period of time and the respective age of those users.

Figure 9:
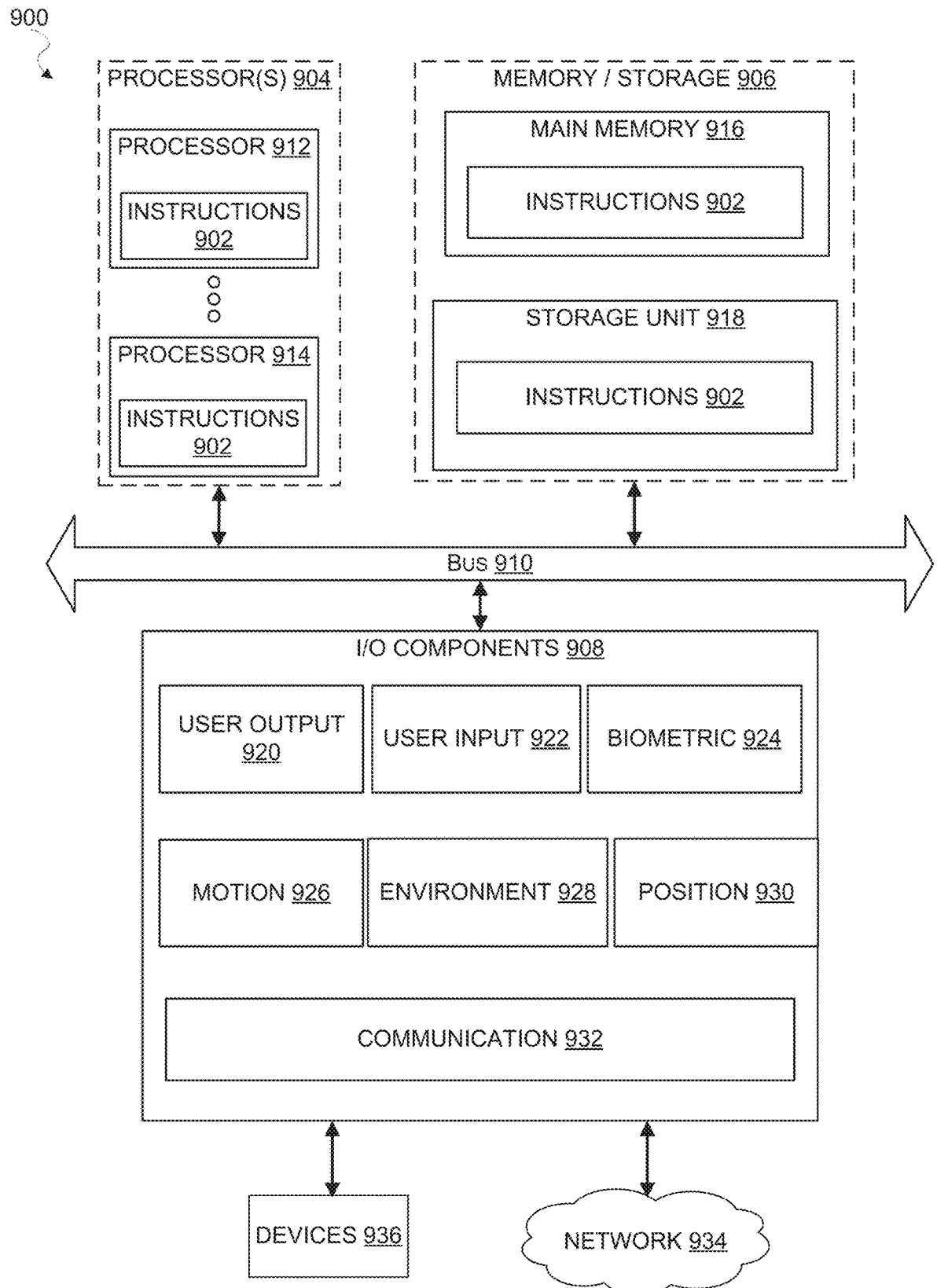
FIG. 9 is a block diagram illustrating components of a machine, in the form of a computer system, that may read and execute instructions from one or more machine-readable media to perform any one or more methodologies described herein, in accordance with one or more example implementations.

FIG. 9 is a block diagram illustrating components of a machine 900, according to some example implementations, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 902 (e.g., software, a program, an application, an apples, an app, or other executable code) for causing the machine 900 to perform any one or more of the methodologies discussed herein may be executed. As such, the instructions 902 may be used to implement modules or components described herein. The instructions 902 transform the general, non-programmed machine 900 into a particular machine 900 programmed to carry out the described and illustrated functions in the manner described. In alternative implementations, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 902, sequentially or otherwise, that specify actions to be taken by machine 900. Further, while only a single machine 900 is illustrated, the term "machine" shall also be taken to include a collection of machines that individually or jointly execute the instructions 902 to perform any one or more of the methodologies discussed herein.

Figure 10:
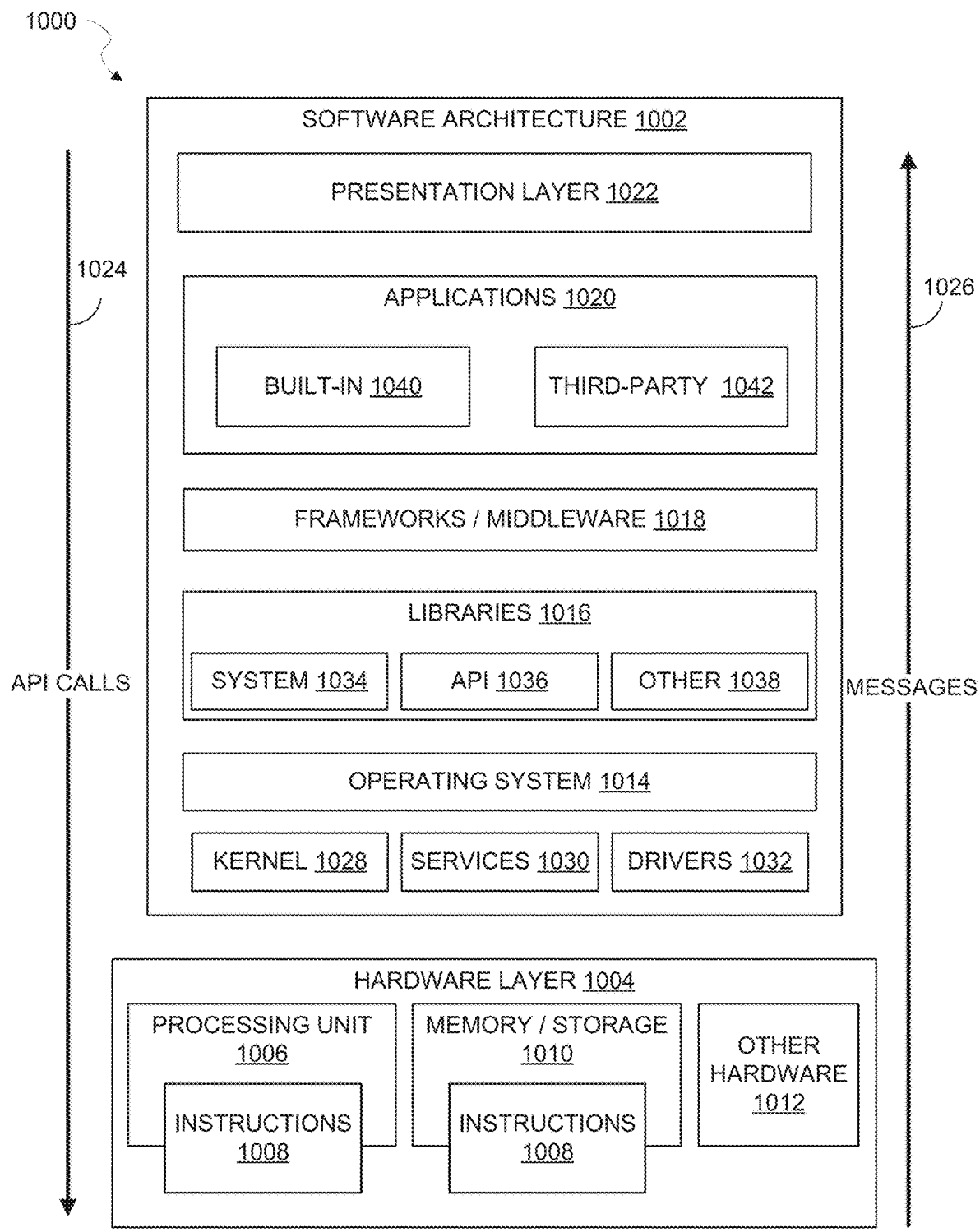
FIG. 10 is block diagram illustrating a representative software architecture that may be used in conjunction with one or more hardware architectures described herein, in accordance with one or more example implementations.

The machine 900 may include processors 904, memory/storage 906, and I/O components 908, which may be configured to communicate with each other such as via a bus 910. In an example implementation, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 902. The term "processor" is intended to include multi-core processors 904 that may comprise two or more independent processors (sometimes referred to as "cores") that may execute instructions 902 contemporaneously, Although FIG. 10 shows multiple processors 904, the machine 900 may include a single processor 912 with a single core, a single processor 912 with multiple cores (e.g., a multi-core processor), multiple processors 912, 914 with a single core, multiple processors 912, 914 with multiple cores, or any combination thereof.

The memory/storage 906 may include memory, such as a main memory 916, or other memory storage, and a storage unit 918, both accessible to the processors 904 such as via the bus 910. The storage unit 918 and main memory 916 store the instructions 902 embodying any one or more of the methodologies or functions described herein. The instructions 902 may also reside, completely or partially, within the main memory 916, within the storage unit 918, within at least one of the processors 904 (e.g., within the processor's cache memory), or any suitable combination thereof, during execution thereof by the machine 900. Accordingly, the main memory 916, the storage unit 918, and the memory of processors 904 are examples of machine-readable media.

The I/O components 908 may include a wide variety of components to receive input, provide output, produce output, transmit information, exchange information, capture measurements, and so on. The specific I/O components 908 that are included in a particular machine 900 will depend on the type of machine. For example, portable machines such as mobile phones will likely include a touch input device or other such input mechanisms, while a headless server machine will likely not include such a touch input device. It will be appreciated that the I/O components 908 may include many other components that are not shown in FIG. 9. The I/O components 908 are grouped according to functionality merely for simplifying the following discussion and the grouping is in no way limiting. In various example implementations, the I/O components 908 may include user output components 920 and user input components 922. The user output components 920 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 922 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 908 may include biometric components 924, motion components 926, environmental components 928, or position components 930 among a wide array of other components. For example, the biometric components 924 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 926 may include acceleration sensor components (e.g., accelerometer), gravitation sensor components, rotation sensor components (e.g., gyroscope), and so forth. The environmental components 928 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 930 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 may include communication components 932 operable to couple the machine 900 to a network 934 or devices 936. For example, the communication components 932 may include a network interface component or other suitable device to interface with the network 934. In further examples, communication components 932 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 936 may be another machine 900 or any of a wide variety of peripheral devices (e.g., a peripheral device coupled via a USB).

Moreover, the communication components 932 may detect identifiers or include components operable to detect identifiers. For example, the communication components 932 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 932, such as location via Internet Protocol (IP) geo-location, location via Wi-Fi® signal triangulation, location via detecting an NFC beacon signal that may indicate a particular location, and so forth.

FIG. 10 is a block diagram illustrating system 1000 that includes an example software architecture 1002, which may be used in conjunction with various hardware architectures herein described. FIG. 10 is a non-limiting example of a software architecture and it will be appreciated that many other architectures may be implemented to facilitate the functionality described herein. The software architecture 1002 may execute on hardware such as machine 900 of FIG. 9 that includes, among other things, processors 904, memory/storage 906, and input/output (I/O) components 908. A representative hardware layer 1004 is illustrated and can represent, for example, the machine 900 of FIG. 9. The representative hardware layer 1004 includes a processing unit 1006 having associated executable instructions 1008. Executable instructions 1008 represent the executable instructions of the software architecture 1002, including implementation of the methods, components, and so forth described herein. The hardware layer 1004 also includes at least one of memory or storage modules memory/storage 1010, which also have executable instructions 1008. The hardware layer 1004 may also comprise other hardware 1012.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1022. Operationally, the applications 1020 or other components within the layers may invoke API calls 1024 through the software stack and receive messages 1026 in response to the API calls 1024. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 are responsible for controlling or interfacing with the underlying hardware. For instance, the drivers 1032 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 provide a common infrastructure that is used by at least one of the applications 1020, other components, or layers. The libraries 1016 provide functionality that allows other software components to perform tasks in an easier fashion than to interface directly with the underlying operating system 1014 functionality (e.g., kernel 1028, services 1030, drivers 1032). The libraries 1016 may include system libraries 1034 (e.g., C standard library) that may provide functions such as memory allocation functions, string manipulation functions, mathematical functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 (also sometimes referred to as middleware) provide a higher-level common infrastructure that may be used by the applications 1020 or other software components/modules. For example, the frameworks/middleware 1018 may provide various graphical user interface functions, high-level resource management, high-level location services, and so forth. The frameworks/middleware 1018 may provide a broad spectrum of other APIs that may be utilized by the applications 1020 or other software components/modules, some of which may be specific to a particular operating system 1014 or platform.

The applications 1020 include built-in applications 1040 and third-party applications 1042. Examples of representative built-in applications 1040 may include, but are not limited to, a contacts application, a browser application, a book reader application, a location application, a media application, a messaging application, or a game application. Third-party applications 1042 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1042 may invoke the API calls 1024 provided by the mobile operating system (such as operating system 1014) to facilitate functionality described herein.

The applications 1020 may use built-in operating system functions (e.g., kernel 1028, services 1030, drivers 1032), libraries 1016, and frameworks/middleware 1018 to create UIs to interact with users of the system. Alternatively, or additionally, in some systems, interactions with a user may occur through a presentation layer, such as presentation layer 1022. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 902 for execution by the machine 900, and includes digital or analog communications signals or other intangible medium to facilitate communication of such instructions 902. Instructions 902 may be transmitted or received over the network 110, 934 using a transitory or non-transitory transmission medium via a network interface device and using any one of a number of well-known transfer protocols.

"CLIENT DEVICE," in this context, refers to any machine 900 that interfaces to a communications network 110, 934 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 934.

"COMMUNICATIONS NETWORK," in this context, refers to one or more portions of a network 110, 934 that may be an ad hoc network, an intranet, an extranet, virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 934 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 902 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 902. The term "machine-readable medium" shall also be taken to include any medium, or combination of multiple media, that is capable of storing instructions 902 (e.g., code) for execution by a machine 900, such that the instructions 902, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 904 or other programmable processor. Once configured by such software, hardware components become specific machines (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor 912, 914 or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 912, 914 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 110 (e.g., the Internet) and via one or more appropriate interfaces (e.g., an API). The performance of certain of the operations may be distributed among the processors, not only residing within a single machine 900 but deployed across a number of machines. In some example implementations, the processors 904 or processor-implemented components may be located in a single geographic location (e.g., within a home environment, an office environment, or a server farm). In other example implementations, the processors 904 or processor-implemented components may be distributed across a number of geographic locations.

"PROCESSOR," in this context, refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may, for example, be a CPU, a RISC processor, a CISC processor, a GPU, a DSP, an ASIC, a RFIC or any combination thereof. A processor 904 may further be a multi-core processor having two or more independent processors 904 (sometimes referred to as "cores") that may execute instructions 902 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:
   obtaining, by one or more computing devices, target audience information from a creator of an augmented reality content item indicating one or more characteristics of a target audience of the augmented reality content item;
   generating, by at least one computing device of the one or more computing devices, a user tracking component for the augmented reality content item, the user tracking component being executable to analyze profile data of client application users that interact with the augmented reality content item, and wherein computer-readable instructions of the user tracking component are embedded in additional computer-readable instructions of the augmented reality content item and individual instances of the augmented reality content item include an instance of the user tracking component;
   sending, by at least one computing device of the one or more computing devices, a request to an instance of the augmented reality content item to obtain one or more metrics related to usage of the instance of the augmented reality content item by one or more users of the client application;
   receiving, by at least one computing device of the one or more computing devices and from the instance of the user tracking component in response to the request, data indicating one or more additional characteristics of the one or more users included in the profile data of the one or more users;
   performing, by at least one computing device of the one or more computing devices, an analysis of the one or more additional characteristics in relation to one or more criteria to generate values of the one or more metrics; and generating, by at least one computing device of the one or more computing devices, one or more user interfaces that include results of the analysis.

2. The method of claim 1, wherein the user tracking component:
analyzes values of the one or more additional characteristics of the one or more users of the client application that interacted with the augmented reality content item with respect to the one or more characteristics of the target audience; and
updates a metric corresponding to a characteristic of the one or more characteristics of the target audience in response to determining that user profile data of the one or more users corresponds to the characteristic.

3. The method of claim 1, comprising:
receiving, by at least one computing device of the one or more computing devices, tracked user data from a plurality of user tracking components that correspond to a plurality of instances of the augmented reality content item that are being accessed by a number of users of the client application; and
aggregating, by at least one computing device of the one or more computing devices, the tracked user data to perform the analysis with respect to the one or more metrics.

4. The method of claim 3, comprising:
sending, by at least one computing device of the one or more computing devices, respective requests to the plurality of user tracking components to obtain the tracked user data.

5. The method of claim 1, comprising:
receiving, by at least one computing device of the one or more computing devices, tracked user data from a plurality of user tracking components that correspond to a plurality of augmented reality content items, individual augmented reality content items of the plurality of augmented reality content items corresponding to different creators of augmented reality content that are being accessed by a number of users of the client application.

6. The method of claim 1, comprising:
receiving, by at least one computing device of the one or more computing devices, a request from a client device of a user of the client application to share the augmented reality content item with an additional user of the client application;
generating, by at least one computing device of the one or more computing devices, message content that includes information to access the augmented reality content item; and
sending, by at least one computing device of the one or more computing devices, the message content to a client device of the additional user of the client application.

7. The method of claim 6, wherein the information indicates one or more restrictions with respect to the augmented reality content item.

8. The method of claim 7, comprising:
receiving, by at least one computing device of the one or more computing devices, a request from the client device of the additional user of the client application to access the augmented reality content item;
determining, by at least one computing device of the one or more computing devices, that characteristics of the additional user of the client application do not satisfy the one or more restrictions; and
adding, by at least one computing device of the one or more computing devices, a first instance of the augmented reality content item to a collection of augmented reality content items of the user.

9. The method of claim 8, comprising:
determining, by at least one computing device of the one or more computing devices, that one or more first characteristics of the additional user of the client application correspond to one or more second characteristics of the target audience of the augmented reality content item;
providing, by at least one computing device of the one or more computing devices, one or more recommendations to the additional user of the client application that include a recommendation to access the augmented reality content item; and
causing, by at least one computing device of the one or more computing devices, a second instance of the augmented reality content item to be accessible to the client device of the additional user.

10. The method of claim 9, comprising:
determining, by at least one computing device of the one or more computing devices, that an additional collection of augmented reality content items of the additional user of the client application includes multiple instances of the augmented reality content item; and
removing, by at least one computing device of the one or more computing devices, the second instance of the augmented reality content item from the additional collection of augmented reality content items based on a list of priorities related to the augmented reality content item.

11. A system comprising:
one or more hardware processors; and
one or more non-transitory computer-readable storage media including computer-readable instructions that, when executed by the one or more hardware processors, cause the one or more hardware processors to perform operations comprising:
obtaining target audience information from a creator of an augmented reality content item indicating one or more characteristics of a target audience of the augmented reality content item;
generating a user tracking component for the augmented reality content item, the user tracking component being executable to analyze profile data of client application users that interact with the augmented reality content item, and wherein computer-readable instructions of the user tracking component are embedded in additional computer-readable instructions of the augmented reality content item and individual instances of the augmented reality content item include an instance of the user tracking component;
sending a request to an instance of the augmented reality content item to obtain one or more metrics related to usage of the instance of the augmented reality content item by one or more users of the client application;
receiving, from the instance of the user tracking component in response to the request, data indicating one or more additional characteristics of the one or more users included in the profile data of the one or more users;
performing an analysis of the one or more additional characteristics in relation to one or more criteria to generate values of the one or more metrics; and generating one or more user interfaces that include results of the analysis.

12. The system of claim 11, wherein:
the user tracking component is encrypted; and
the request sent to the instance of the augmented reality content item to obtain the one or more metrics includes decryption information related to the user tracking component.

13. The system of claim 11, wherein the one or more non-transitory computer-readable storage media include additional computer-readable instructions that, when executed by the one or more hardware processors, cause the one or more hardware processors to perform additional operations comprising:
receiving tracked user data from a plurality of user tracking components that correspond to a plurality of instances of the augmented reality content item that are being accessed by a number of users of the client application; and
aggregating the tracked user data to perform the analysis with respect to the one or more metrics.

14. The system of claim 11, wherein the one or more non-transitory computer-readable storage media include additional computer-readable instructions that, when executed by the one or more hardware processors, cause the one or more hardware processors to perform additional operations comprising:
receiving a request from a client device of a user of the client application to share the augmented reality content item with an additional user of the client application;
generating message content that includes information to access the augmented reality content item; and
sending the message content to a client device of the additional user of the client application.

15. The system of claim 14, wherein the one or more non-transitory computer-readable storage media include additional computer-readable instructions that, when executed by the one or more hardware processors, cause the one or more hardware processors to perform additional operations comprising:
receiving a request from the client device of the additional user of the client application to access the augmented reality content item; and
adding a first instance of the augmented reality content item to a collection of augmented reality content items of the user.

16. The system of claim 15, wherein:
the one or more non-transitory computer-readable storage media include additional computer-readable instructions that, when executed by the one or more hardware processors, cause the one or more hardware processors to perform additional operations comprising:
determining that one or more first characteristics of the additional user of the client application correspond to one or more second characteristics of the target audience of the augmented reality content item;
providing one or more recommendations to the additional user of the client application that include a recommendation to access the augmented reality content item; and
sending a second instance of the augmented reality content item to the client device of the additional user.

17. The system of claim 16, wherein the one or more non-transitory computer-readable storage media include additional computer-readable instructions that, when executed by the one or more hardware processors, cause the one or more hardware processors to perform additional operations comprising:
determining that an additional collection of augmented reality content items of the additional user of the client application includes multiple instances of the augmented reality content item; and
removing the second instance of the augmented reality content item from the additional collection of augmented reality content items based on a list of priorities related to the augmented reality content item.

18. One or more non-transitory computer-readable media comprising computer-readable instructions, which when executed by a computing device, cause the computing device to perform operations comprising:
obtaining target audience information from a creator of an augmented reality content item indicating one or more characteristics of a target audience of the augmented reality content item;
generating a user tracking component for the augmented reality content item, the user tracking component being executable to analyze profile data of client application users that interact with the augmented reality content item, and wherein computer-readable instructions of the user tracking component are embedded in additional computer-readable instructions of the augmented reality content item and individual instances of the augmented reality content item include an instance of the user tracking component;
sending a request to an instance of the augmented reality content item to obtain one or more metrics related to usage of the instance of the augmented reality content item by one or more users of the client application;
receiving, from the instance of the user tracking component in response to the request, data indicating one or more additional characteristics of the one or more users included in the profile data of the one or more users;
performing an analysis of the one or more additional characteristics in relation to one or more criteria to generate values of the one or more metrics; and
generating one or more user interfaces that include results of the analysis.

19. The one or more non-transitory computer-readable media of claim 18, further comprising additional computer-readable instructions, which when executed by a computing device, cause the computing device to perform additional operations comprising:
receiving tracked user data from a plurality of user tracking components that correspond to a plurality of augmented reality content items, individual augmented reality content items of the plurality of augmented reality content items corresponding to different creators of augmented reality content, that are being accessed by a number of users of the client application.

20. The one or more non-transitory computer-readable media of claim 19, further comprising additional computer-readable instructions, which when executed by a computing device, cause the computing device to perform additional operations comprising:
determining a first restriction in relation to access of the augmented reality content item that is related to age of users of the client application requesting to access the augmented reality content item; and
determining a second restriction in relation to access of the augmented reality content item that is related to geographic location of users of the client application requesting to access the augmented reality content item.

\* \* \* \* \*